United States Patent

Granger

[15] 3,695,770
[45] Oct. 3, 1972

[54] METHOD AND APPARATUS FOR DEMONSTRATING PHOTOMETRIC PROCEDURES

[72] Inventor: Charles R. Granger, 742 Hawkeye Drive, Iowa City, Iowa 52240

[22] Filed: July 13, 1970

[21] Appl. No.: 54,423

[52] U.S. Cl. ................356/180, 356/186, 356/201
[51] Int. Cl. ........................G01j 3/50, G01n 21/24
[58] Field of Search....250/43.5 R, 218, 226; 356/51, 356/180–186, 201, 204–206, 244, 246; 350/312

[56] References Cited

UNITED STATES PATENTS

| | | | |
|---|---|---|---|
| 1,675,967 | 7/1928 | Zitkowski | 356/182 |
| 2,043,816 | 6/1936 | Story | 356/246 |
| 2,193,315 | 3/1940 | Evelyn | 250/218 X |
| 2,632,045 | 3/1953 | Sziklai | 350/312 X |
| 2,232,169 | 2/1941 | Diller | 356/244 X |
| 2,085,190 | 6/1937 | Gretener et al. | 350/312 |

FOREIGN PATENTS OR APPLICATIONS 450,576    7/1936    Great Britain............356/180

Primary Examiner—Ronald L. Wibert
Assistant Examiner—F. L. Evans
Attorney—Haven E. Simmons and James C. Nemmers

[57] ABSTRACT

A method and apparatus for demonstrating photometric procedures and conducting colorimetric analysis. The apparatus provides a confined light path from a light source, and a test tube containing a known colored solution and a second tube containing the pure solvent to be used for an unknown concentration of the solute are placed in the light path. Transmission of the light through the tubes is measured, and then an unknown concentration of the solute is added to the second tube and the light transmission again measured and compared with the first measurement. The difference in light transmission can then be used by well known physical laws to determine the unknown concentration.

3 Claims, 2 Drawing Figures

PATENTED OCT 3 1972    3,695,770
FIG 1
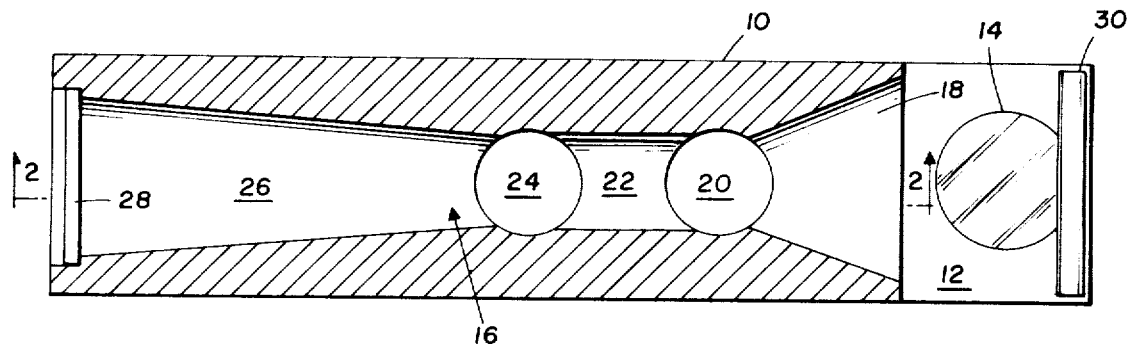
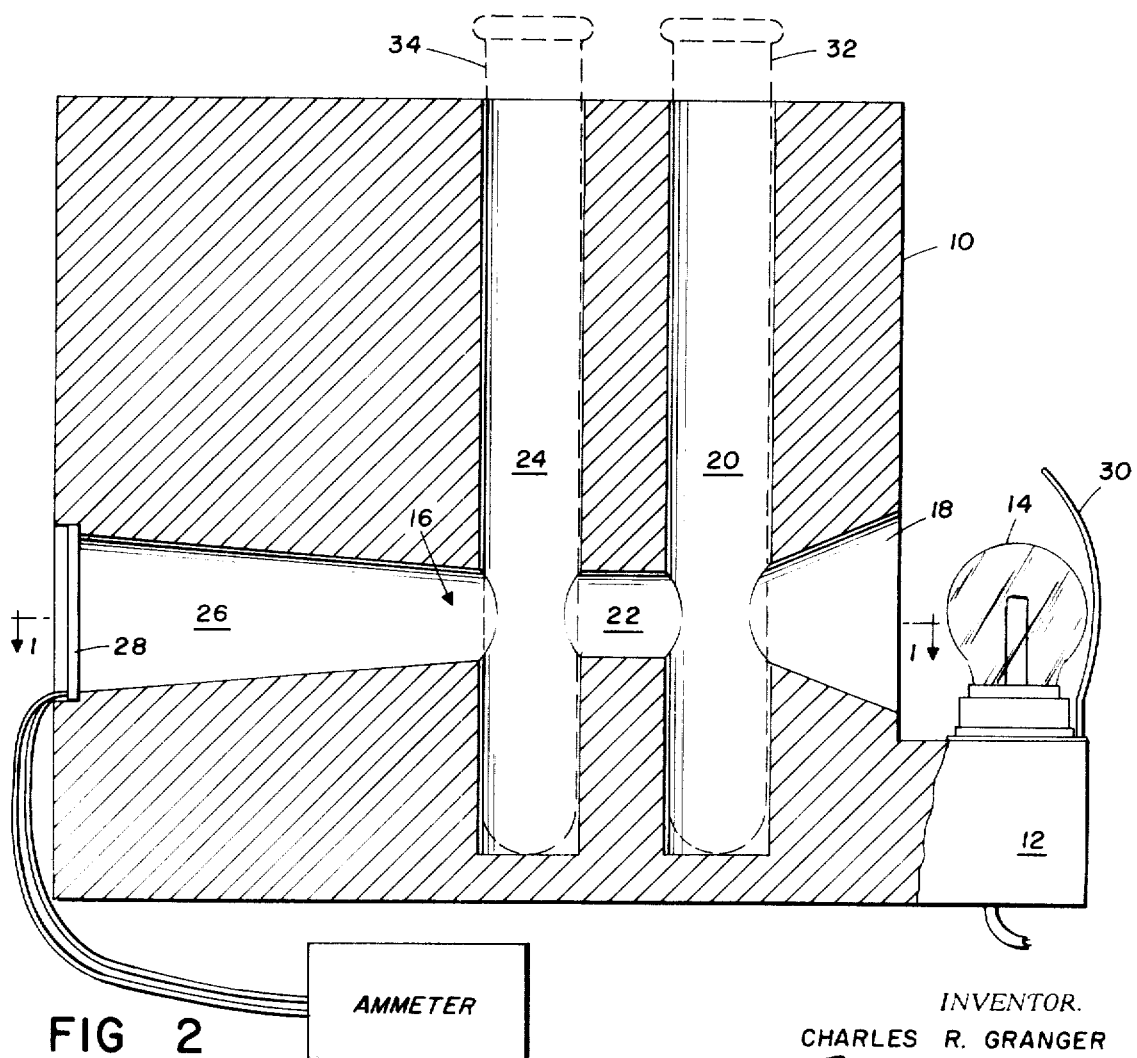
FIG 2
INVENTOR.
CHARLES R. GRANGER
BY James C. Nemmers
ATTORNEY

METHOD AND APPARATUS FOR DEMONSTRATING PHOTOMETRIC PROCEDURES

BACKGROUND OF THE INVENTION

As a form of radiant energy, light exists in a continuous series of wave lengths. Thus, when a beam of light passes through a true solution, part of the light is absorbed by the constituents of the solution. Light absorption by solution systems is selective, and the wave lengths of light absorbed are dictated by the chemical and physical characteristics of the specific solution through which the light passes. As is well known to those skilled in the art, the Beer-Lambert Law mathematically defines the relationship between the thickness of the medium through which the light passes, the concentration of the light absorbing matter in the solution, and the intensity of the light energy transmitted through the solution. Since the light absorptive capacity of a colored solution is a function of the concentration of a specific constituent present in the solution, colorimetric measurements are extensively employed in determining the quantity of the various constituents in the solution. These basic principles are well known, but their application has not been generally available to students of the physical sciences because the demonstrative apparatus presently known and used are relatively complex and expensive.

SUMMARY OF THE INVENTION

The invention provides an inexpensive method and apparatus for demonstrating photometric procedures. Because the expense of the apparatus is considerably less than known apparatus, and because the methods employed are simple, photometric analysis will be a tool readily available to any student of science. The apparatus may also be used to conduct colorimetric analysis of solution systems in research and laboratory teaching situations. The simplicity of the apparatus and the method employing it result from the incorporation into a single housing, a sample holder, a light filter holder, a confined light path, a light source and a photosensitive cell. The invention utilizes inexpensive solutions and test tubes for light filters rather than specially prepared colored glass, complex prisms or defraction gratings. The specific shape of the confined light path combined with the specific placement in the light path of the light filter tube and sample tube completely eliminates the need for lenses ordinarily used in apparatus of this type.

DESCRIPTION OF THE DRAWINGS

FIG. 1 is a top view, partly in section, taken on the line 1 — 1 of FIG. 2 and illustrating the unitary apparatus of my invention; and FIG. 2 is a side elevation view, partly in section, taken on the line 2—2 of FIG. 1, and further illustrating the details of my novel apparatus.

DESCRIPTION OF THE PREFERRED EMBODIMENT

My novel apparatus includes a one piece housing 10 made from any suitable material. The housing 10 is preferably rectangular, as shown, and has an outwardly extending ledge 12 along the lower edge of one end on which is mounted a light source 14 of any suitable type. The intensity of the light source 14 is determined according to the amount of intensity required and can be varied if desired by incorporating a potentiometer (not shown) in the circuit supplying the light source. A light path, indicated generally by the reference numeral 16, is formed by milling, drilling or molding housing 10. The light path 16 extends horizontally through housing 10 as shown and has an entrance portion 18 located closely adjacent to and in line with light source 14. The entrance 18 converges from the light source 14, terminating in a vertical passageway 20, the purpose of which will be more fully described hereinafter. The light path 16 extends beyond vertical passageway 20 through an intermediate portion 22 of substantially uniform diameter and terminates in a second vertical passageway 24. The purpose of the second vertical passageway 24 will also be described more fully hereinafter. The light path 16 continues from passageway 24 through a diverging portion 26 and terminates at the end of housing 10 opposite the light source 14. At the terminal end of the diverging portion 26 there is mounted a photosensitive cell 28 of any suitable type for measuring the amount of light transmitted to it.

In order to direct the light from light source 14 into light path 16 there is preferably provided around the outside of source 14 a reflector 30 of any suitable type. Also, the light path 16 is preferably coated with a high reflective material so as to insure maximum light impingement on the photo cell 28.

As shown in the drawings, the two vertical passageways 20 and 24 are formed at 90° to and directly in the center of the light path 16. Each of these two passageways 20 and 24 are formed to a diameter and height to receive standard laboratory test tubes 32 and 34 as indicated by the dotted lines in FIG. 2. The diameter of the intermediate portion 22 of light path 16 is smaller than the diameter of each of the passageways 20 and 24 to insure that all light from the light source 14 must pass through both test tubes 32 and 34 and their contents before reaching photo cell 28. Vertical passageway 24 provides a holder for test tube 34 which contains a sample of the solution of unknown concentration to be determined. Vertical passageway 20 is a holder for test tube 32 into which there is placed an appropriately colored fluid that serves as a filter. The fluid serving as a filter is selected for a series of tests and can be selected from any assortment of dyes or common fluids, such as ink, etc. The selected filter fluid provides a wave length at which colorimetric analysis will take place.

As previously indicated, test tube 32 containing the filter fluid is placed into the vertical passageway 20. Initially, the pure solvent for the unknown concentration of the solute to be determined is placed in test tube 34 which is in turn placed into the vertical passageway 24. Preferably, the photo cell 28 is connected in series with a microammeter (not shown) which in turn is connected in parallel with two in-series potentiometers (also not shown). One potentiometer may be used but two provide both a course adjustment of the microammeter while the other can be used for a fine adjustment.

With the filter and sample tubes 32 and 34 in place, and with light being emitted from the light source 14, the ammeter is adjusted to 100 percent transmittance by the use of the potentiometers. The test tube 34 containing the pure solvent for the sample is then removed and there is substituted a test tube containing an unknown concentration of the solute. A second reading on the ammeter is then taken which reading will change according to the Beer-Lambert Law. Using this law, the unknown concentration in the sample tube 34 can be mathematically determined.

Using this simple apparatus, and the method described in the preceding paragraph, photometric analysis and procedures can be readily demonstrated. The method is extremely simple and can be easily performed by any student of science. The housing 10 provides a simple unitary apparatus which contains the photo cell 28, light source 14, light path 16 and a holder for both the sample tube 34 and the filter tube 32. The filter tube 32 is a common inexpensive substitute which replaces for demonstration purposes the rather complex prisms or defraction gratings in the more expensive instruments. By utilizing a completely enclosed light path, maximum utilization is made of the light source 14, and the confined light path 16 prevents interference with the demonstration by light from outside sources. The specific shape of the light path 16 shown in the drawings provides a most efficient transmission of the light from the light source 14 through the filter and sample tubes 32 and 34 to the photo cell 28 without the use of mirrors, prisms, lenses or other costly items. The distance of the photo cell 28 from the light source 14 will be determined by the nature of the photo cell itself, the shape of the light path 16 and the optics designed into the light path by the sample tube 34, its contents, and the filter tube 32 and its contents. The distance between the two vertical passageways 20 and 24 and their distance from the light source 14 and photo cell 28 are also determined by the optical characteristics generated by the filter and sample tubes, their contents, the nature of the light path 16 and intensity of light source 14. These distances are determined so that the light waves passing through filter tube 32 will converge on the contents of sample tube 34, and the light waves passing through sample tube 34 will diverge toward photo cell 28 with the maximum efficiency. The design of the light path 16, of course, is such that all of the light traveling down the light path must pass through the tubes 32 and 34 and their contents.

It will be obvious to those skilled in the art that various revisions and modifications can be made in the specific embodiment shown herein without departing from the spirit and scope of the invention. It is my intention, however, that all such revisions and modifications as are obvious to those skilled in the art will be included within the scope of the following claims.

I claim:

1. An apparatus for demonstrating measurement of the light absorptive capacity of liquid systems, said apparatus comprising a housing, a light passageway extending horizontally through said housing, a light source combined with said housing at one end of said passageway, a photocell combined with said housing at the other end of said passageway, said passageway providing a substantially confined path from said light source to said photocell, a first substantially vertical passageway in said housing fixed relative to and intersecting said light passageway at substantially 90°, a second substantially vertical passageway in said housing parallel to and spaced along said light passageway from said first passageway and fixed relative to and intersecting said light passageway at substantially 90°, said light passageway converging from said light source toward said first passageway and diverging from said second passageway toward said photocell, the portion of said light passageway between said first and second passageways being of substantially uniform diameter, the distance between said first and second passageways being less than the distance from said second passageway to said photocell so as to provide maximum light transmission from said light source to said photocell, a transparent liquid container removably received in said first and second passageways, the said container in the first passageway and its relative position in the light passageway causing the light waves from said light source to converge while the said container in the second passageway and its relative position in the light passageway causes the light waves to diverge toward the photocell, said first and second passageways being open to the exterior of said housing only through the ends of said light passageway and where said containers are inserted, one of said containers containing a liquid filter solution and the other an unknown solution, and means operatively connected to said photocell to measure the amount of light incident upon said photocell after passing through said filter solution and unknown solution in said liquid containers.

2. The apparatus of claim 1 in which said liquid containers are common test tubes.

3. The apparatus of claim 2 in which said first and second passageways are substantially the same diameter, and the portion of said light passageway intersected by said first and second passageways is no larger in diameter than said first and second passageways.

* * * * *